(12) United States Patent
Sakai

(10) Patent No.: US 7,149,906 B2
(45) Date of Patent: Dec. 12, 2006

(54) COMMUNICATION DEVICE

(75) Inventor: Kenichi Sakai, Tokyo (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 10/470,318

(22) PCT Filed: Nov. 11, 2002

(86) PCT No.: PCT/JP02/11734

§ 371 (c)(1),
(2), (4) Date: Jul. 25, 2003

(87) PCT Pub. No.: WO03/049399

PCT Pub. Date: Jun. 12, 2003

(65) Prior Publication Data

US 2004/0243861 A1    Dec. 2, 2004

(30) Foreign Application Priority Data

Nov. 30, 2001  (JP)  ............................. 2001-367859

(51) Int. Cl.
G06F 1/26 (2006.01)
G06F 1/32 (2006.01)
G06F 11/30 (2006.01)
G06F 3/00 (2006.01)

(52) U.S. Cl. ............... 713/300; 713/320; 713/323; 713/324; 713/340; 710/15; 710/18; 710/62; 710/63; 710/64; 710/72; 710/73; 710/74; 710/313

(58) Field of Classification Search ............... 710/15, 710/18, 62–64, 72–74, 300–304, 313; 713/300, 713/310, 320, 321, 323, 324, 340

See application file for complete search history.

(56) References Cited

U.S. PATENT DOCUMENTS

| | | | |
|---|---|---|---|
| 5,938,770 A * | 8/1999 | Kim ........................... | 713/300 |
| 6,128,743 A * | 10/2000 | Rothenbaum ............... | 713/300 |
| 6,170,062 B1 * | 1/2001 | Henrie ........................ | 713/340 |
| 6,230,277 B1 * | 5/2001 | Nakaoka et al. ............ | 713/320 |
| 6,272,644 B1 * | 8/2001 | Urade et al. ................ | 713/320 |
| 6,614,483 B1 * | 9/2003 | Lee et al. ................ | 348/391.1 |
| 6,708,278 B1 * | 3/2004 | Howard et al. ............. | 713/323 |
| 6,829,726 B1 * | 12/2004 | Korhonen .................... | 714/25 |
| 6,845,422 B1 * | 1/2005 | Shimada et al. ............ | 710/305 |

FOREIGN PATENT DOCUMENTS

| JP | 6-85867 | 3/1994 |
|---|---|---|
| JP | 7-93061 | 4/1995 |
| JP | 11-212681 | 8/1999 |
| JP | 2000-284867 | 10/2000 |

* cited by examiner

Primary Examiner—Tanh Q. Nguyen
(74) Attorney, Agent, or Firm—Frommer Lawrence & Haug LLP; William S. Frommer; Thomas F. Presson

(57) ABSTRACT

A communication device which transmits/receives data to/from a host device connected thereto via a bus having a signal line and a power line. A communication controller which is always supplied with power as long as a bus is connected thereto and a MCU are so arranged as to use different power, and only supply of power to the MCU is interrupted when a connected host device comes into stand-by state. In case the connected host device resumes from the stand-by state, the communication controller responds to communication from the host device until the MCU resumes control of data transmission/reception with the host device.

4 Claims, 4 Drawing Sheets

COMMUNICATION DEVICE

This Application claims priority to PCT Application PCT/JP02/11734, filed on Nov. 11, 2002.

TECHNICAL FIELD

The present invention relates to a communication device which receives power via a bus such as the USB (Universal Serial Bus), and performs desired operations with a host device connected thereto.

This application claims priority of Japanese Patent Application No. 2001-367859, filed on Nov. 30, 2001 in Japan, the entirety of which is incorporated by reference herein.

BACKGROUND ART

As a bus for connecting an electronic device such as a personal computer to peripheral devices, there is known the USB (Universal Serial Bus) bus.

The bus, which is represented by the USB bus, is a serial transmission bus comprising a power line for supplying power to an electronic device connected thereto and a transmission line for transmitting/receiving data. The bus can employ unconstrained connection configuration such as the daisy chain and node branch, and can transmit data preferentially. Furthermore, employing the bus, cables can be attached or detached with an electronic device being supplied with power, and a network under the bus can be automatically restructured at the time when nodes are added or removed. Thus, the bus, which is represented by the USB bus, is used as an interface of an electronic device such as a VTR, a video camera, a color scanner, or a digital still camera which sends and receives multimedia data.

Respective electronic devices using the bus as an interface cannot freely consume arbitrary power, and are subject to power consumption stipulated based on specification given in advance. Especially, when there is no bus activity on the USB bus for more than a predetermined period of time due to suspension, etc. of an electronic device (referred to as stand-by state, hereinafter), power which can be consumed by the electronic device using the bus is restricted to 500 μA at most. So, in order to fulfill stipulated power consumption in the stand-by state, an electronic device is caused to transition into low power consumption mode in which power consumption of the electronic device is suppressed to the least.

As semiconductor processes are caused to be refined recently, even though an electronic device transitions into low power consumption mode, leak current increases in a semiconductor circuit of the electronic device, which cannot fulfill stipulated power consumption in the stand-by state. Especially, in a ASIC having a large-scale MCU (Memory Control Unit) or MPU (Micro Processing Unit) built therein, power consumption may increase to approximately 1 mA even in low power consumption mode.

On the other hand, in case power of an electronic device is shut down in the stand-by state, when resuming from the stand-by state, since a long time is required for rise time of a power source and for initialization time of a semiconductor circuit, there is raised a problem that the electronic device is judged to be disconnected from the bus by a connected external device.

DISCLOSURE OF THE INVENTION

Accordingly, the present invention has an object to provide a new communication device which can overcome the above-mentioned drawbacks of the prior art.

The present invention has another object to provide a communication device which can fulfill stipulated power consumption in the stand-by state, and can always respond to communication from an external device when resuming from the stand-by state.

The above object can be attained by providing a communication device which transmits/receives data to/from a host device connected thereto via a bus having a signal line and a power line, comprising communication control means which can always respond to communication from the host device, the communication control means being always supplied with power as long as at least the bus is connected thereto, communication function means for controlling data transmission/reception with the host device through the communication control means, the communication function means working under power supplied via at least the bus, and power supply control means for controlling supply of power to the communication function means, wherein, in case the host device transits into stand-by state, the power supply control means interrupts supply of power to the communication function means.

According to the communication device, the communication control means which is always supplied with power as long as the bus is connected thereto and the communication function means which may come into the state in which supply of power is interrupted are separated, and only supply of power to the communication function means is interrupted when the connected host device comes into the stand-by state.

These objects and other objects, features and advantages of the present invention will become more apparent from the following detailed description of the preferred embodiments of the present invention.

BEST MODE FOR CARRYING OUT THE INVENTION

The present invention will further be described below concerning the best modes with reference to the accompanying drawings.

Figure 1:
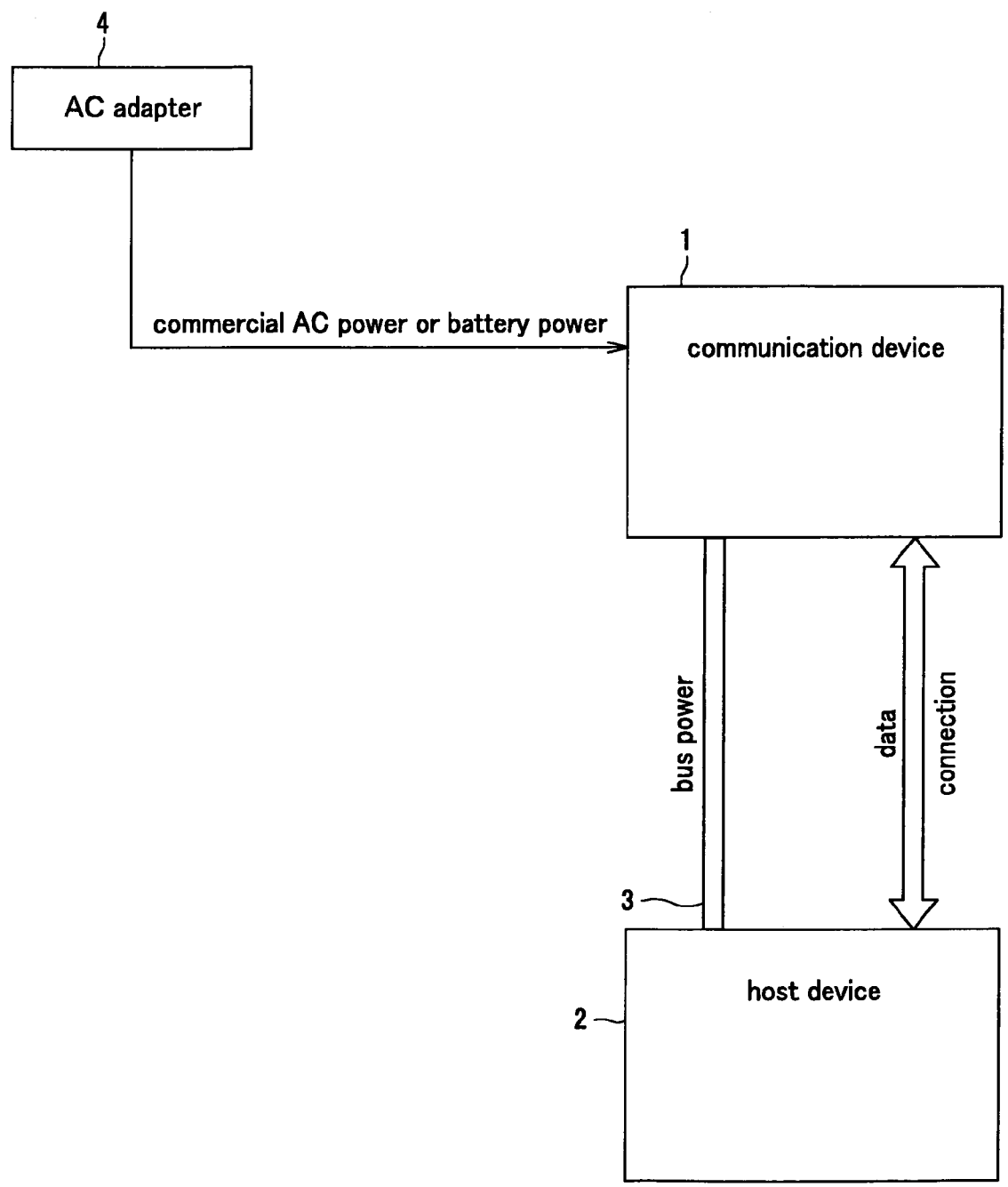
FIG. 1 shows a block diagram showing system configuration employing the communication device according to the present invention.

The present invention can be employed in a communication device 1 connected to a host device 2, as shown in FIG. 1. The communication device 1 and the host device 2 are connected to each other via a bus 3. The bus 3 is used as an interface of an electronic device such as a VTR, a video camera, a color scanner, or a digital still camera which sends and receives multimedia data. The bus 3 can use cables and connectors of low cost by employing high speed data transfer, real time data transfer, and serial bus, which leads to reduction in system cost.

As the connection manner of the bus 3, which is represented by the USB bus, two kinds of methods or the "daisy chain" and "node branch" are employed. Employing the bus 3, cables can be attached or detached with the communication device 1 and the host device 2 being supplied with power, and a network under the bus 3 can be automatically restructured at the time when nodes are added or removed.

The communication device 1 shown in FIG. 1 employs the USB bus connection, and is connected to the host device 2 such as a personal computer which also conforms to the USB standard.

The communication device 1 is supplied with power via the bus 3. In case commercial AC power can be obtained, the communication device 1 may be supplied with the commercial AC power using an AC adapter 4. Also, the communication device 1 may be supplied with power from a battery.

Figure 2:
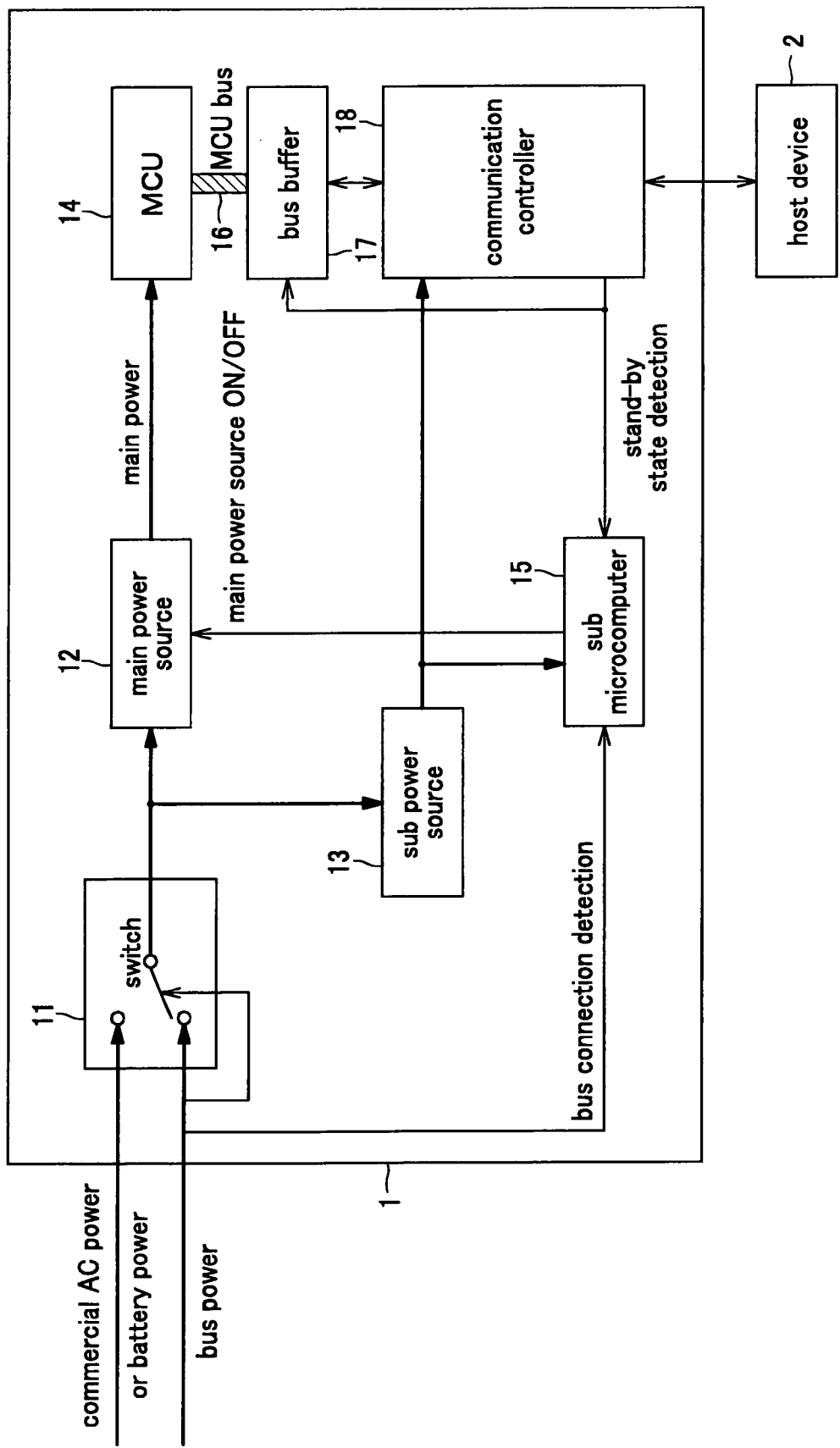
FIG. 2 shows a block diagram showing internal configuration of the communication device according to the present invention.

The communication device 1 includes a switch 11, a main power source 12, a sub power source 13, an MCU (Memory Control Unit) 14, a sub microcomputer 15, an MCU (Memory Control Unit) bus 16, a bus buffer 17, and a communication controller 18, as shown in FIG. 2.

The switch 11 may be a relay which mechanically works, and are connected to the bus 3 and to the AC adapter 4. The switch 11 switches either to the bus 3 side or to the AC adapter 4 side, and supplies either power to the communication device 1. When detecting power supplied via the bus 3, the switch 11 automatically switches to the bus 3 side.

The main power source 12 has its ON/OFF controlled by the sub microcomputer 15 connected thereto, and supplies power from the switch 11 to the MCU 14.

The sub power source 13 supplies power from the switch 11 to the sub microcomputer 15 and to the communication controller 18. The sub power source 13 differs from the main power source 12 in that power is always supplied thereto as long as the bus 3 and the AC adapter 4 or the battery are connected to the communication device 1.

The MCU 14 works under power supplied from the main power source 12. Being connected only to the main power source 12 which may be set to be OFF, the MCU 14 may come into suspended state due to interruption of supply of power. The MCU 14 writes/reads out data to/from the bus buffer 17 through the MCU bus 16. Since the communication controller 18 sends/receives data to/from the bus buffer 17, the MCU 14 can send/receive data to/from the communication controller 18. Furthermore, the MCU 14 controls data communication with the host device 2 through the communication controller 18.

The sub microcomputer 15 works under power supplied from the sub power source 13. The sub microcomputer 15 is notified of the state of the host device 2 from the communication controller 18, and controls ON/OFF of the main power source 12 based on the state. Furthermore, when the bus 3 is connected to the communication device 1, the sub microcomputer 15 notifies the MCU 14 of this matter.

The communication controller 18 is connected to the bus buffer 17, and sends/receives data to/from the bus buffer 17. The communication controller 18 is connected to the host device 2, and detects the state of the host device 2 minutely. Furthermore, being supplied with power from the sub power source 13 which can always supply power, the communication controller 18 never comes into suspended state and can always respond to communication from the host device 2, as is different from the case of the MCU 14.

Figure 3:
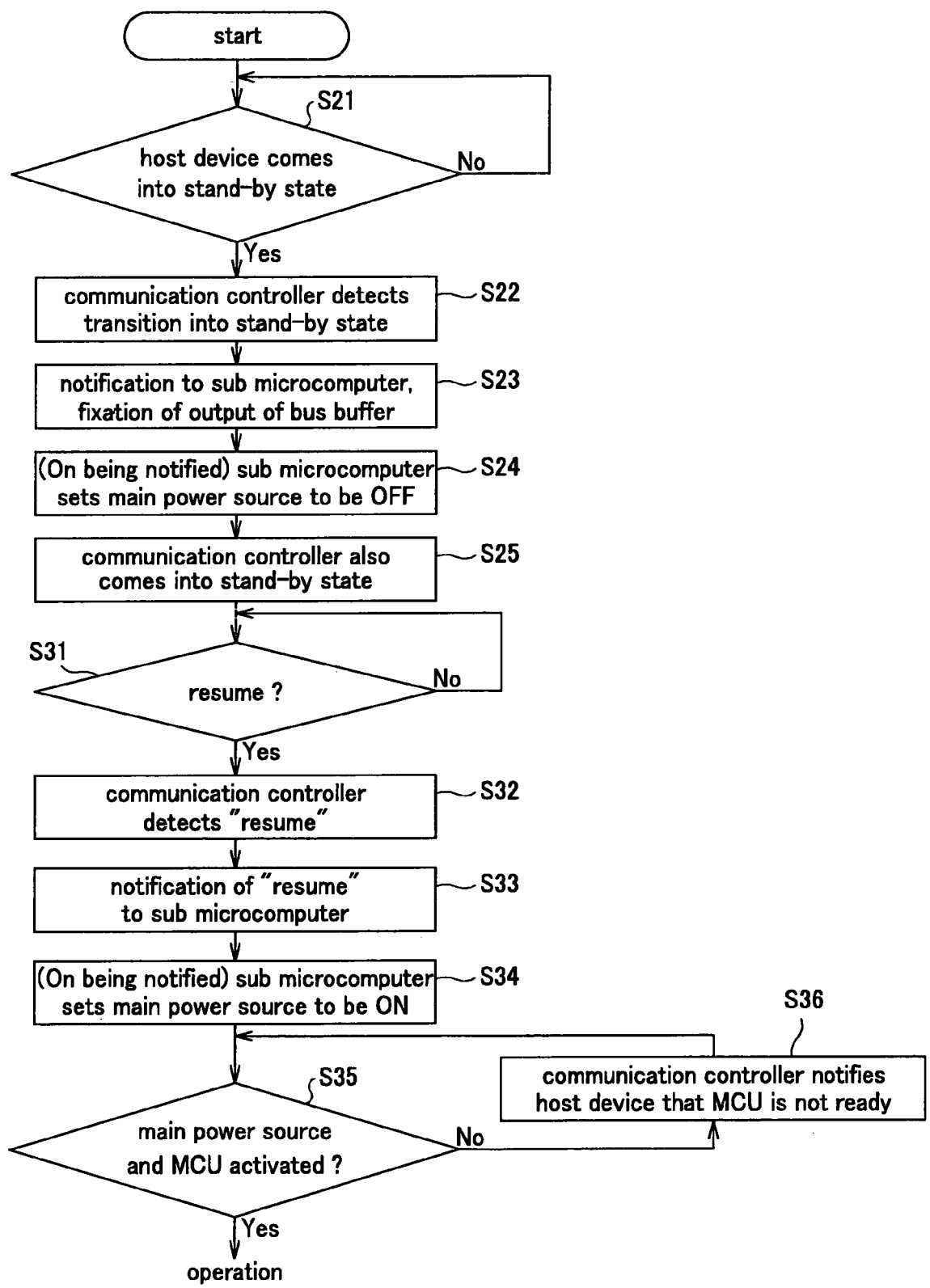
FIG. 3 shows a flow chart showing the operation of the communication device according to the present invention.

The operation of the communication device 1 according to the present invention will be explained with reference to a flow chart shown in FIG. 3.

When the host device 2 comes into and remains in suspended state for more than a predetermined period of time due to suspension, etc., that is, comes into the stand-by state (step S21), the communication controller 18 detects this state in step S22.

Then in step S23, the communication controller 18 notifies the sub microcomputer 15 that the host device 2 comes into the stand-by state, and fixes the output of the bus buffer 17. Thus, the communication controller 18 can make all accesses from the MCU 14 through the MCU bus 16 invalid, and when the power of the MCU 14 is set to be OFF afterward, malfunction of the communication controller 18 due to indefinite data on the MCU bus 16 can be prevented.

Then in step S24, the sub microcomputer 15 which is notified that the host device 2 comes into the stand-by state from the communication controller 18 sets the main power source 12 to be OFF. Thus, supply of power to the MCU 14, whose power consumption is large in the stand-by state, is interrupted, which can reduce the whole power consumption of the communication device 1, thereby fulfilling stipulated power consumption in the stand-by state. At this time, the communication controller 18 similarly comes into the stand-by state (step S25).

On the other hand, when the host device 2 resumes from the stand-by state in step S31, then in step S32, the communication controller 18 detects this state. In case of the USB, this is the "resume" state.

Then in step S33, the communication controller 18 notifies the sub microcomputer 15 that the host device 2 resumes from the stand-by state. The sub microcomputer 15 which is notified of this state from the communication controller 18 sets the main power source 12 to be ON, in step S34. Thus, power is resupplied to the MCU 14 which is not supplied with power during the stand-by state. Then, the MCU 14 which is supplied with power is activated (step S35).

Even though the MCU 14 is activated in step S35, in case a long time is required until the main power source 12 is completely activated and initialization of the MCU 14 is completed, or until the MCU 14 resumes control of data transmission/reception with the host device 2, the communication controller 18 continuously notifies the host device 2 that the MCU 14 is not ready to work (step S36). Thus, the host device 2 does not judge that the bus 3 is disconnected.

Figure 4:
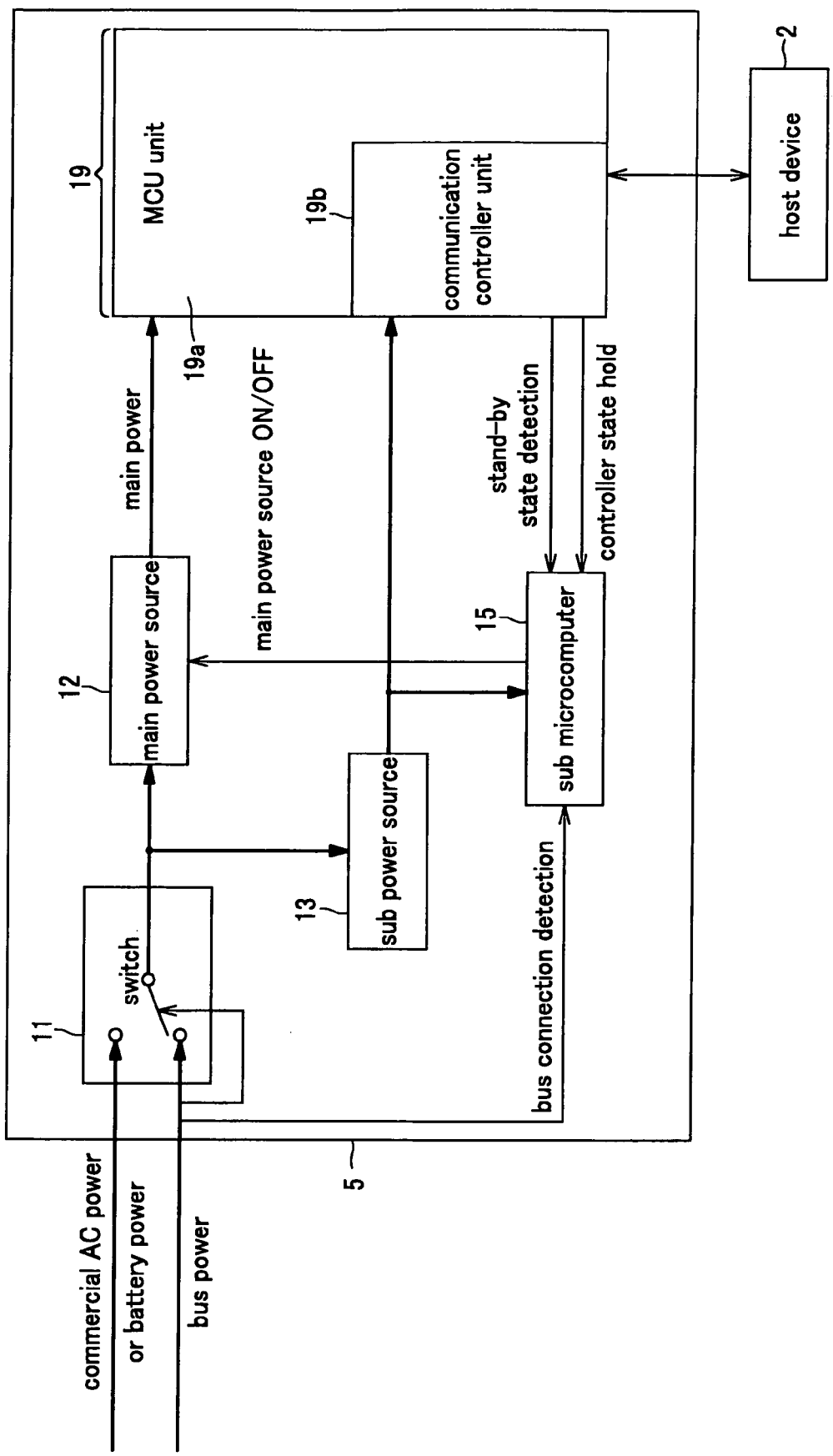
FIG. 4 shows a block diagram showing internal configuration of the communication device according to the present invention, in which an MCU unit and a communication controller unit are arranged on the same LSI.

The present invention is not restricted to above-described embodiment. For example, this invention is applicable to a communication device 5 in which an MCU and a communication controller are arranged on the same LSI, as shown in FIG. 4. In the communication device 5 shown in FIG. 4, parts or components similar to those of the communication device 1 are indicated with the same reference numerals, and detailed explanation of which will be omitted.

The communication device 5 includes a switch 11, a main power source 12, a sub power source 13, a sub microcomputer 15, and an LSI 19. The LSI 19 has at least an MCU unit 19a and a communication controller unit 19b integrated therein.

The MCU unit 19a is supplied with power from only the main power source 12. Being connected to the main power source 12 which may be set to be OFF, the MCU unit 19a may come into suspended state due to interruption of supply of power. The MCU unit 19a controls data communication with the host device 2 through the communication controller unit 19b.

The communication controller unit 19b is supplied with power from the sub power source 13. Being supplied with power from the sub power source 13 which can always supply power, the communication controller unit 19b never come into suspended state and can always respond to communication from the host device 2, as is different from the case of the MCU unit 19a.

The LSI 19 operates two portions, that is, components including the MCU unit 19a and the communication controller unit 19b, by using different power. Since the MCU unit 19a which may come into suspended state due to interruption of supply of power and the communication controller unit 19b which is always supplied with power are arranged on the LSI 19, different power is used in the LSI 19.

Furthermore, the LSI 19 has a terminal, not shown, for separating the MCU unit 19a and the communication controller unit 19b so as to prevent change of state in the communication controller unit 19b which occurs when the MCU unit 19a comes into suspended state due to interruption of supply of power.

The operation of the communication device 5 will be explained.

When the host device 2 comes into the stand-by state, the communication controller unit 19b detects this state. Then, the communication controller unit 19b notifies the sub microcomputer 15 that the host device 2 comes into the stand-by state, and make all accesses through an MCU bus, not shown, invalid. Thus, when the power of the MCU unit 19a is set to be OFF afterward, malfunction such as that the MCU unit 19a writes indefinite data to a register of the communication controller unit 19b can be prevented.

Then, the sub microcomputer 15 which is notified that the host device 2 comes into the stand-by state sets the main power source 12 to be OFF. Thus, supply of power to the MCU unit 19a, whose power consumption is large in the stand-by state, is interrupted, which can reduce the whole power consumption of the communication device 5. At this time, the communication controller unit 19b similarly comes into the stand-by state.

On the other hand, when the host device 2 resumes from the stand-by state, the communication controller unit 19b detects this state. Then, the communication controller unit 19b notifies the sub microcomputer 15 that the host device 2 resumes from the stand-by state, and the sub microcomputer 15 which is notified of this state sets the main power source 12 to be ON. Thus, power is resupplied to the MCU unit 19a which is not supplied with power during the stand-by state.

Similarly, in case a long time is required for activation of the main power source 12 and for initialization of the MCU unit 19a, the communication controller unit 19b continuously notifies the host device 2 that the MCU unit 19a is not ready to work. Even though the main power source 12 is set to be OFF in the stand-by state, being always supplied with power from the sub power source 13, the communication controller unit 19b can always respond to communication from the host device 2.

As in the above, in the communication device employing the present invention, the communication controller which is always supplied with power as long as the bus or commercial power source is connected thereto and the MCU are arranged on the same LSI or on different LSIs using different power, and only supply of power to the MCU is interrupted when the host device 2 comes into the stand-by state. Thus, the whole power consumption of the communication device can be reduced, thereby fulfilling stipulated power consumption in the stand-by state.

In the communication device 1 employing the present invention, when the connected host device 2 is activated, the host device 2 is continuously notified that the MCU 14 is not ready to work until the main power source 12 is completely activated and initialization of the MCU 14 is completed. Thus, the host device 2 does not judge that the bus 3 is disconnected.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

As in the above, in the communication device employing the present invention, the communication control means which is always supplied with power as long as the bus is connected thereto and the communication function means are so arranged as to use different power, and only supply of power to the communication function means is interrupted when the connected host device comes into the stand-by state. Thus, the whole power consumption of the communication device can be reduced.

In the communication device employing the present invention, in case the connected host device resumes from the stand-by state, the communication control means responds to communication from the host device until the communication function means resumes control of data transmission/reception with the host device. Thus, the host device does not judge that the bus is disconnected.

The invention claimed is:

1. A communication device for transmitting/receiving data to/from a host device connected thereto via a bus having a signal line and a power line, comprising:
   communication control means for responding to communication from the host device, the communication control means being supplied with power while the bus is connected thereto;
   communication function means for controlling data transmission/reception with the host device through the communication control means, the communication function means working under power supplied via the bus, wherein said communication function means comprises a Memory Control Unit (MCU); and
   power supply control means for controlling supply of power to the communication function means based on the state of the host device notified from the communication control means;
   wherein, when the host device transits into stand-by state, the power supply control means interrupts supply of power to the communication function means, and when communication control means detects a resumed active state of the host device, the power supply control means resupplies power to the communication function means, and
   wherein the communication control means notifies the host device of a ready status of the communication function means.

2. The communication device as set forth in claim 1, wherein, when the host device resumes from the stand-by state, the communication control means responds to communication from the host device until the communication function means resumes control of data transmission/reception with the host device.

3. The communication device as set forth in claim 1, further comprising:
   selection means for selecting either power from power supplied via the bus or commercial power as power to be supplied to the communication function means and to the communication control means,
   wherein, when detecting the power supplied via the bus, the selection means selects the power supplied via the bus.

4. The communication device as set forth in claim 1, wherein the communication control means and the communication function means are arranged on the same LSI.

* * * * *